(12) United States Patent  
Rohs

(10) Patent No.: US 8,303,462 B2  
(45) Date of Patent: Nov. 6, 2012

(54) FRICTION-RING TRANSMISSION HAVING A FRICTION RING, AND METHOD FOR PRODUCING A FRICTION CONE

(76) Inventor: Ulrich Rohs, Dueren (DE)

( * ) Notice: Subject to any disclaimer, the term of this patent is extended or adjusted under 35 U.S.C. 154(b) by 547 days.

(21) Appl. No.: 12/460,197

(22) Filed: Jul. 15, 2009

(65) Prior Publication Data

US 2010/0016117 A1    Jan. 21, 2010

(30) Foreign Application Priority Data

Jul. 16, 2008   (DE) .......................... 10 2008 033 329

(51) Int. Cl.
*F16H 15/16*   (2006.01)
(52) U.S. Cl. ........................................... 476/52; 476/51
(58) Field of Classification Search .................... 476/47, 476/50, 51, 52, 53
See application file for complete search history.

(56) References Cited

U.S. PATENT DOCUMENTS

| | | | |
|---|---|---|---|
| 3,411,369 A | 11/1968 | Hammann et al. | |
| 6,093,131 A * | 7/2000 | Rohs | 476/53 |
| 7,654,930 B2 * | 2/2010 | Rohs et al. | 476/53 |

FOREIGN PATENT DOCUMENTS

| | | |
|---|---|---|
| CH | 405 856 | 1/1966 |
| DE | 1 644 925 | 6/1971 |
| EP | 1 855 028 | 11/2007 |
| FR | 615 350 | 1/1927 |
| FR | 31 504 | 3/1927 |
| FR | 1079768 | 12/1954 |
| WO | WO 2007/025522 | 3/2007 |

* cited by examiner

*Primary Examiner* — David M Fenstermacher  
(74) *Attorney, Agent, or Firm* — Collard & Roe P.C.

(57) ABSTRACT

A friction-ring transmission has a friction ring, a first friction cone including a first friction-ring running surface, a second friction cone including a second friction-ring running surface, and at least one axial friction-ring securing element for preventing critical travel of the friction ring beyond the friction-ring running surface. The friction ring is disposed to be displaceable axially on the friction-ring running surfaces and in a gap between the friction cones, whereby the at least one axial friction-ring securing element is disposed on at least one of the friction cones.

20 Claims, 2 Drawing Sheets

FRICTION-RING TRANSMISSION HAVING A FRICTION RING, AND METHOD FOR PRODUCING A FRICTION CONE

CROSS REFERENCE TO RELATED APPLICATIONS

Applicants claim priority under 35 U.S.C. §119 of German Application No. 10 2008 033 329.8 filed on Jul. 16, 2008.

BACKGROUND OF THE INVENTION

1. Field of the Invention

The present invention relates to a friction-ring transmission having a friction ring, a first friction cone including a first friction-ring running surface, a second friction cone including a second friction-ring running surface and axial friction-ring securing means for preventing critical travel of the friction ring beyond the friction-ring running surface. More particularly, the present invention relates to a friction-ring transmission in which the friction ring is displaceable axially on the friction-ring running surfaces in a gap between the friction cones. Furthermore, the invention relates to a method for producing a friction cone having a running surface for a friction ring of a friction-ring transmission, in which method the friction cone is forged from a metal material.

2. The Prior Art

Friction-ring transmissions of the class in question are well known from the prior art and are frequently used, especially in automotive engineering, as force and torque converters.

A friction-ring transmission of the class in question is known, for example, from International Patent Application WO 2007/025522 A2, which comprises substantially a first friction cone, a second friction cone and a friction body that actively establishes communication between these two friction cones, as well as other transmission elements. Whereas the first friction cone and the second friction cone can each rotate around their own axis of rotation at a fixed distance from one another, the friction body can be axially displaced at this distance along the axes of rotation of the friction bodies. For this purpose the friction body is mounted in a suitable positioning device. In order to improve the operating safety of the friction-cone transmission substantially, fluid means capable of acting between the main transmission elements are, on the one hand, supplied directly to the active regions of the main transmission elements, using a fluid-means supply. On the other hand, emergency running capabilities can be imparted to the friction-cone transmission with a redundant regulating mechanism, thus ensuring that the cone-type friction-ring transmission almost always remains operative, even if, for example, the positioning mechanism of the friction body can no longer function properly. In this way the operating safety of the entire friction-cone transmission can also be increased advantageously.

SUMMARY OF THE INVENTION

It is an object of the present invention to further develop a friction-ring transmission of the class in question, especially in such a way that the operating safety of a friction-ring transmission of the class in question is further improved.

These and other objects are achieved according to the invention firstly by a friction-ring transmission having a friction ring, a first friction cone including a first friction-ring running surface, a second friction cone including a second friction-ring running surface, and axial friction-ring securing means for preventing critical travel of the friction ring beyond the friction-ring running surface. In this transmission the friction ring is disposed to be freely displaceable axially on the friction-ring running surfaces and in a gap between the friction cones. The friction-ring transmission is characterized in particular in that the axial friction-ring securing means are disposed on at least one of the friction cones. In this way, in a suitable configuration, the axial friction-ring securing means can be disposed on at least one of the friction cones, and such axial friction-ring securing means can be structurally integrated into a friction-ring transmission in particularly simple manner. In particular, the need for additional components, for example on a guide device of the friction ring, can be obviated with the axial friction-ring securing means on at least one of the friction cones, whereby the friction-ring transmission can be built to be very compact.

In the present case, the term "friction-ring transmission" encompasses especially such friction-ring transmissions in which the friction ring surrounds one of the two friction cones of the friction-ring transmission. In other words, one of the two friction cones is disposed inside the friction ring and thus can engage frictionally on the inner side of the friction ring, while the other of the two friction cones can engage frictionally on the outer circumference of the friction ring. It is self-evident that the axial friction-ring securing means can also be used advantageously on friction-ring transmissions in which the friction bodies interacting with the friction ring deviate from a conical geometry, or in which the arrangement between friction ring and cones is different. The present invention, however, relates mainly to friction-ring transmissions having conically shaped friction bodies, because force or torque conversion can be achieved in particularly simple manner with these bodies.

Furthermore, in another aspect the invention also provides a friction-ring transmission having a friction ring, having a first friction cone comprising a first friction-ring running surface, having a second friction cone comprising a second friction-ring running surface, in which transmission the friction ring is disposed to be freely displaceable axially on the friction-ring running surfaces in a gap between the friction cones, and which is characterized in that at least one of the two friction cones is provided with means for narrowing the gap.

An extremely good option for securing the friction ring of the friction-running surfaces axially in the sense of the present invention is to provide means on the friction cones for narrowing or reducing the gap between the two friction cones of the friction-ring transmission. As a result, even in a critical operating condition of the friction-ring transmission, the friction ring is not capable of separating from the friction-ring running surfaces or shifting axially beyond the ends of at least one of the two friction cones. In this way, it can almost always be ensured that the present friction-ring transmission will not fail, at least not for the reason that the two friction cones can no longer communicate with one another by means of the friction ring.

In addition to or as an alternative to the aforementioned characteristics, the axial friction-ring securing means can be configured to rotate with the friction ring and/or the at least one friction cone, in the case of a friction-ring transmission having a friction ring, a first friction cone including a first friction-ring running surface, a second friction cone including a second friction-ring running surface, and axial friction-ring securing means for preventing critical travel of the friction ring beyond the friction-ring running surface, in which transmission the friction ring is disposed to be freely displaceable axially on the friction-ring running surfaces and in a gap between the friction cones. In this way, on the one hand steady running can be maximized when the friction-ring securing means are reached, and on the other hand the wear can be minimized when a corresponding friction-ring securing means is reached.

For this purpose, the corresponding friction-ring securing means can be equipped, on the one hand, with revolving pulleys or rollers, for example, which are accordingly provided in fixed position or displaceably on separate devices. Such devices are not to be confused with the positioning means that are present in any case, with which the friction ring and therefore the transmission ratio can be adjusted during normal operation. On the other hand, the friction-ring securing means can also be provided in fixed relationship on the friction ring and/or on at least one friction cone, with the result that corresponding revolution takes place directly.

In this connection it must be emphasized that WO 2007/025522 and U.S. Pat. No. 6,093,131 illustrate examples of the prior art of the class in question pertinent to the three foregoing solutions, and in particular also explain the axially free displaceability in detail. Especially in a departure from the cone-type friction-ring transmissions disclosed in CH 405 856 or in FR 31 504, for example, such free displaceability means that merely the angle of the friction ring relative to the cones is varied accordingly, in order to adjust the transmission ratio. Otherwise the friction ring can freely follow the forces exerted on it by the friction cones in response to this angular variation. In contrast, in the cone-type friction-ring transmissions according to CH 405 856 or FR 31 504, the friction ring is forcibly guided and its position is predetermined directly by an axially positionable guide device.

In connection with the advantageous solutions described in the foregoing, a preferred alternative embodiment provides that the axial friction-ring securing means and/or the narrowing means are accordingly disposed on a first edge of the friction-ring running surface of a first of the two friction cones, in such a way that the friction ring cannot travel beyond an oppositely disposed first edge of the friction-ring running surface of the other of the two friction cones, or can do so only slightly. In this way, advantageously, each of the friction rings being used needs to have only one axial friction-ring securing means or only one narrowing means only on one of its friction-ring ends or on one of the two edges of a friction-ring running surface. Thus the friction cones, seen on the whole, can have a more lightweight construction.

Another advantage is if the axial friction-ring securing means and/or the narrowing means of a first of the two friction cones are disposed at least partly above the friction-ring running surface of the other of the two friction cones.

In this way, it can be advantageously ensured that the friction ring does not separate axially from the friction-ring running surfaces of the two friction cones if the friction ring were to come up against the axial friction-ring securing means and/or the narrowing means during a critical operating condition of the friction-ring transmission. If the axial friction-ring securing means and/or the narrowing means are disposed at one axial end of a friction-ring running surface having a smaller friction-ring running-surface circumference, the axial friction-ring securing means or the narrowing means can be made available with a particularly small amount of material on the two friction cones.

It is further advantageous if the axial friction-ring securing means and/or the narrowing means are provided with a shoulder at one axial end of a friction-ring running surface. This shoulder can limit the friction-ring running surface axially. Such a shoulder can effectively prevent travel beyond one of the friction-ring running surfaces of the friction ring.

It is self-evident that such a shoulder can be constructed in diverse forms on a friction cone. For example, a ring is shrink-fitted onto a friction cone for this purpose. Such a shoulder can be provided in particularly simple structural manner, however, on one of the existing friction cones by lathing the shoulder on one friction cone.

If the shoulder has an undercut facing a friction-ring running surface, a contact face at which the friction ring can come into contact with the shoulder during a critical operating condition of the friction-ring transmission can be made substantially smaller. Given a suitable configuration, steady running of the friction ring in this critical operating condition can also be increased in this way, in comparison with known solutions. Furthermore, the load on the shoulder and friction ring is also reduced in this way, and thus possible damage can be largely avoided.

Independently of the foregoing embodiments, the present invention accordingly provides a friction-ring transmission having a friction ring, a first friction cone including a first friction-ring running surface, a second friction cone including a second friction-ring running surface, in which transmission the friction ring is disposed to be displaceable axially on the friction-ring running surfaces in a gap between the friction cones, whereby at least one of the two friction cones is provided with means for narrowing the gap. The means are provided, at one axial end of a friction-ring running surface, with a shoulder that axially limits the friction-ring running surface. The friction-ring transmission is characterized in that the shoulder has an undercut facing a friction-ring running surface.

Likewise independently of the foregoing embodiments, the present invention provides a friction-ring transmission having a friction ring, a first friction cone including a first friction-ring running surface, a second friction cone including a second friction-ring running surface, and axial friction-ring securing means for preventing critical travel of the friction ring beyond the friction-ring running surface. The friction ring in this transmission is disposed to be displaceable axially on the friction-ring running surfaces and in a gap between the friction cones. The axial friction-ring securing means are disposed on at least one of the friction cones and are provided, at one axial end of a friction-ring running surface, with a shoulder that axially limits the friction-ring running surface. The friction-ring transmission is characterized in that the shoulder has an undercut facing a friction-ring running surface.

The friction-ring securing means, especially the shoulders described in the foregoing, can be provided with a bearing face, which rotates around an axis that is aligned parallel to the axis of rotation of the friction ring and that therefore is axially aligned, in particular when the friction ring is perpendicular to the cone axis. In this way, the load for the friction ring can be minimized when it comes into contact with the friction-ring securing means. In this connection it is self-evident that a bearing face configured in such a way is also advantageous for securing the friction ring, regardless of the other characteristics of the present invention.

In order to minimize the load on the friction ring, the friction ring can be configured to be set back in the region of its edges, at least on one of its sides facing the axial friction-ring securing means. This configuration applies, in particular, for the edge facing the friction-ring securing means and the associated friction cone on which the friction-ring securing means are disposed. Preferably, the friction ring is provided on this edge with edge radii having a radius greater than $1/100$ of the friction-ring width, preferably greater than $1/27$ of the friction-ring width.

In an additional or alternative embodiment, the operating safety of a transmission of the class in question can also be increased or improved if the friction-ring transmission includes a traction fluid based on a naphthene oil as a further transmission component. In this connection, it is self-evident that a traction fluid based on a naphthene oil is correspondingly advantageous, independent of the other characteristics of the present invention, in a friction-ring transmission having a friction ring, a first friction cone including a first friction-ring running surface, a second friction cone including a second friction-ring running surface, and a traction fluid, in which transmission the friction ring is displaceable axially on the friction-ring running surfaces in a gap between the friction cones, and in which the traction fluid can act between the friction ring and the friction cones.

By virtue of naphthene oil as a traction fluid, the transfer of torque can be achieved advantageously in a friction-ring transmission, especially in a friction-ring cone-type transmission. Surprisingly, it is hereby possible, on the one hand, to provide a sufficient frictional torque between the transmission elements interacting frictionally with one another, without, on the other hand, suffering large losses, thus contrasting in particular with known traction fluids, such as mineral oils containing solid particles, or silicone oils.

The object of the invention is also achieved by a method for producing a friction cone having a friction-ring running surface for a friction ring of a friction-ring transmission. In this method, the friction cone is forged from a metal material, and the friction cone is manufactured with axial friction-ring securing means for preventing critical travel beyond the friction-ring running surface.

From the viewpoint of manufacturing engineering, the friction-ring securing means on a friction cone can be provided particularly simply by machining the friction-ring securing means on the friction cone by means of a cutting process. Preferably, the friction-ring securing means are lathed onto the friction cone, since lathing of the friction-ring securing means is preferable for a rotationally symmetrical transmission component such as a friction cone. Accordingly, it is advantageous if the friction cone and corresponding friction-ring securing means are formed in one piece.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings.

DETAILED DESCRIPTION OF PREFERRED EMBODIMENTS

Figure 1:
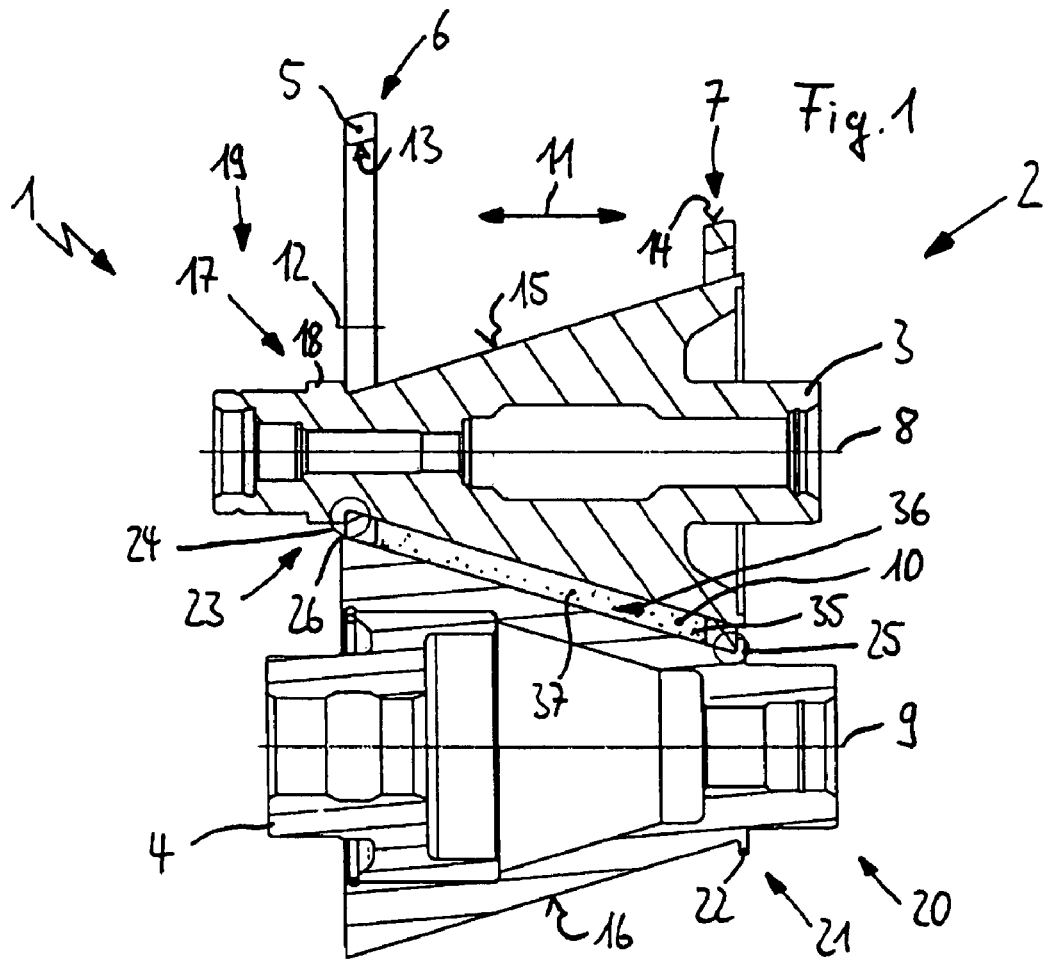
FIG. 1 schematically shows a longitudinal section of a friction-ring transmission with respect to its main transmission elements.

Turning now in detail to the drawings, a construction of a friction-ring transmission having axial friction-ring securing means or having means for narrowing a gap between two friction cones, as well as a transmission component comprising naphthene oil, are schematically illustrated. The main transmission elements or members 1 of a friction-ring transmission 2 shown in FIG. 1 comprise a first friction cone 3, a second friction cone 4, and a friction ring 5, which in the diagram of FIG. 1 is illustrated in a first axial end position 6 and in a second axial end position 7. First friction cone 3 rotates around a first axis of rotation 8, while second friction cone 4 rotates around a second axis of rotation 9.

The two axes of rotation 8 and 9 are disposed parallel to one another, in such a way that there is formed, between the two friction cones 3 and 4, a gap 10 in which friction ring 5 can travel forward and back between axial end positions 6 and 7 at most. In this case friction ring 5 rotates around a friction-ring axis of rotation 12 and interacts with first friction cone 3 on its inner side 13 and with second friction cone 4 on its outer side 14. Thus inner side 13 provides an inner face of friction ring 5 and outer side 14 provides an outer circumferential side of friction ring 5. First friction cone 3 communicates with inner side 13 of friction ring 5 via a first friction-ring running surface 15, and second friction cone 4 communicates with outer side 14 of friction ring 5 by means of a second friction-ring running surface 16.

In the normal operating condition of the friction-ring transmission 2, friction ring 5 is moved in the axial direction 11 on friction-ring running surfaces 15 and 16, respectively, by means of known positioning devices (not shown), so that force or torque conversion can be achieved by means of the participating main transmission elements 1. For this purpose, friction ring 5 is guided in suitable positioning devices (not shown here) of friction-ring transmission 2. By means of the positioning devices, it can usually be ensured already that friction ring 5 will not be moved axially beyond friction-ring running surfaces 15 or 16.

In order to ensure emergency running capability and thus sufficient operating safety of friction-ring transmission 2 in the event of a malfunction of friction-ring transmission 2, especially with respect to the positioning devices, first axial friction-ring securing means 17, which are lathed onto a narrow end 19 of first friction cone 3, in the form of a first shoulder 18, are provided on first friction cone 3. By means of first shoulder 18, it is possible to ensure that friction ring 5 cannot travel beyond its first axial end position 6 and in the process separate both from first friction-ring running surface 15 and second friction-ring running surface 16.

To ensure the same with respect to second axial end position 7 also, second friction cone 4 is lathed at its narrow end 20 to produce the second axial friction-ring securing means 21 in the form of a second shoulder 22.

Because both first shoulder 18 and second shoulder 22 are able to narrow or constrict gap 10 between the two friction cones 3 and 4, these two shoulders 18 and 22 can also be defined as narrowing means 23 (numbered here only with regard to first shoulder 18).

Figure 2:
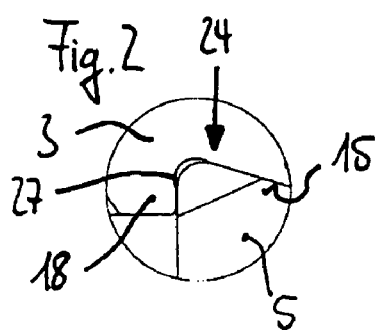
FIG. 2 is a detail view of FIG. 1 schematically showing a lead-in region with respect to an inner side of a friction ring of the friction-ring transmission.

Advantageously, axial friction-ring securing means 17 and 22, respectively, or narrowing means 23, are placed on a first edge 24 (see, in particular, FIG. 2) of the first friction-ring running surface 15, or on a further first edge or second edge 25

Figure 3:
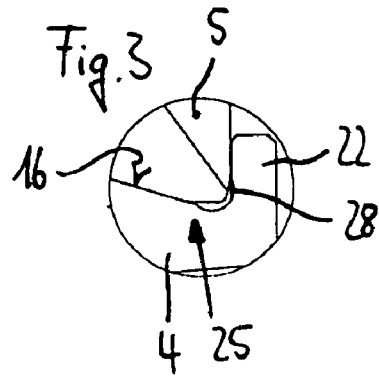
FIG. 3 is a further detail view of FIG. 1 schematically showing a further lead-in region with respect to an outer side of the friction ring of the friction-ring transmission.

(see, in particular, FIG. 3) of second friction-ring running surface 16, so that travel beyond the two friction-ring running surfaces 15 and 16 can be effectively prevented.

In order to keep the masses of the two shoulders 18 and 22 as small as possible and to ensure the lowest possible relative velocity between friction ring 5 and shoulders 18, 22, these shoulders are provided at the narrow ends 19 and 22, respectively, of friction cones 3 and 4, respectively, in each instance.

Thus, by means of shoulder 18 of first friction cone 3, travel beyond friction-ring running surface 16 at an oppositely disposed first edge 26 of second friction cone 4 can be simply prevented, by structural means.

The same is also true with respect to the second edge 25 of second cone 4 opposite first cone 3.

According to the diagram of FIG. 1, at least second shoulder 22 is disposed above first friction-ring running surface 15. Preferably, this arrangement is also the case for all the axial friction-ring securing means 17 and 22, respectively, and/or narrowing means 23.

In order to keep the friction between shoulders 18 or 22 and friction ring 5 as small as possible in the event of a critical operating condition of friction-ring transmission 2, first shoulder 18 in this exemplary embodiment is provided with a first undercut 27, and second shoulder 22 is provided with a second undercut 28, the two undercuts 27 and 28 facing friction-ring running surfaces 15 and 16, respectively. By virtue of undercuts 27, 28, bearing faces in the form of annular disks are formed at shoulders 18, 22 respectively, which faces revolve around an axis oriented parallel to the friction-ring axis of rotation 12, so that the minimal possible load is exerted on friction ring 5.

Figure 4:
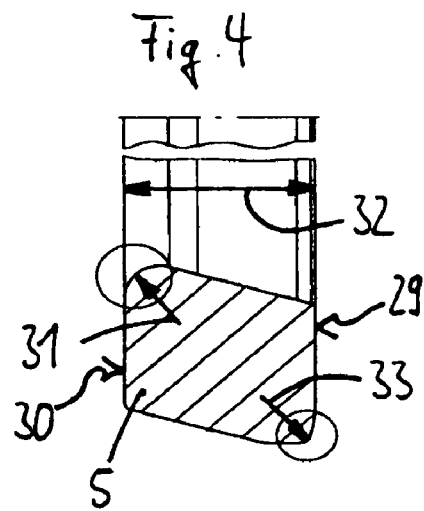
FIG. 4 schematically shows a cross section of the friction ring of the friction-ring transmission according to FIGS. 1 to 3.

Friction ring 5 (see FIG. 4), at least on its sides 29, 30 (first and second facing sides) facing axial friction-ring securing means 17 or 21 and/or narrowing means 23, and respective friction-ring running surface 15, 16, has a first edge radius 31 having a value greater than $1/100$ of the friction-ring width 32 and a second edge radius 33 having a value greater than $1/27$ of the friction-ring width 32.

Furthermore, the efficiency and overall behavior of the present friction-ring transmission 2 can be improved with naphthene oil 35 as a further transmission component 36, which is illustrated only schematically in the diagram according to FIG. 1, as traction fluid 37 splashing around in gap 10.

Figure 5:
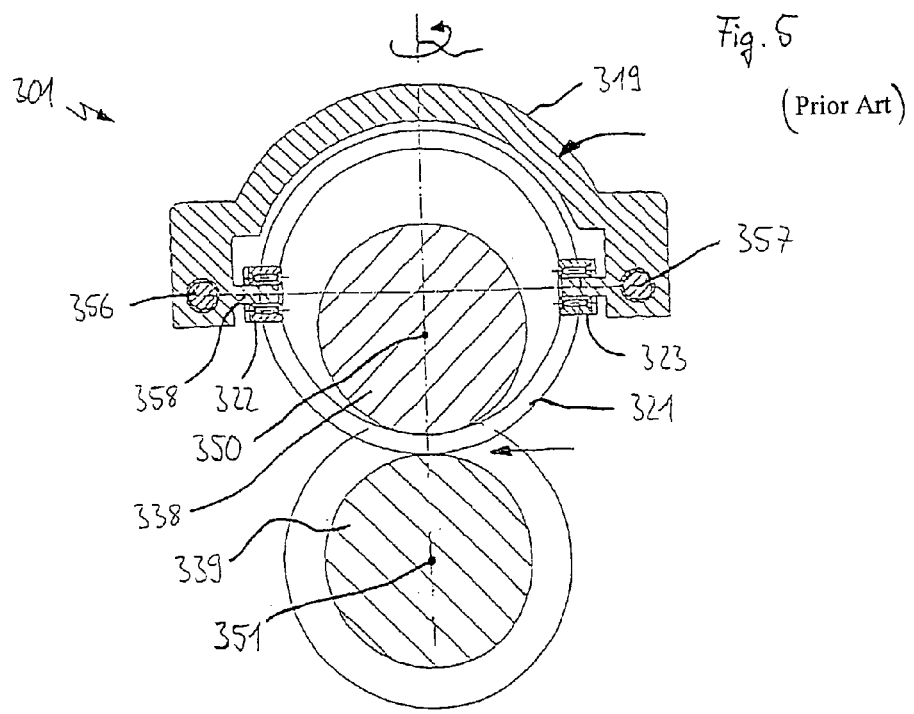
FIG. 5 shows a schematic section through a cone-type friction-ring transmission, for an explanation of a guide device for the friction ring.
Figure 6:
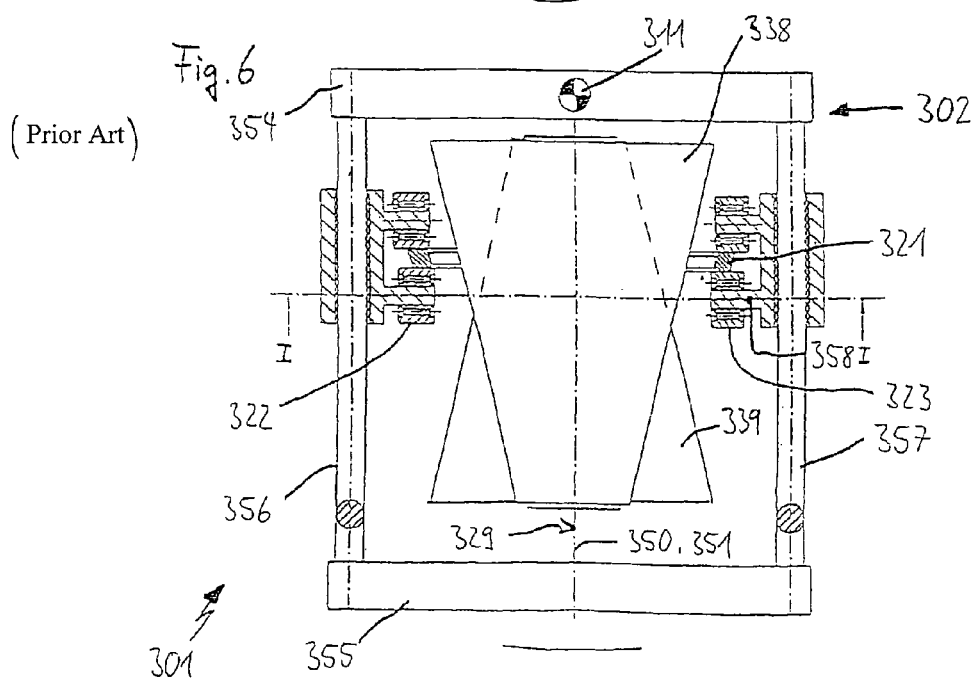
FIG. 6 shows a top view of the arrangement according to FIG. 5.

FIGS. 5 and 6 show a cone-type friction-ring transmission 301. As illustrated in FIGS. 5 and 6, a guide device for friction ring 5, denoted there as friction ring 321, can have a positioning bridge 319, which guides friction ring 321, and a cage 302, on which the positioning bridge 319 is guided. In this case, friction ring 312 actively establishes communication between two friction cones 338 and 339 disposed on parallel roller-body axes 350, 351 spaced radially apart (see arrow in FIG. 5). Friction cones 338, 339 are disposed in opposite directions and have the same cone angle β. Friction ring 321 bridges the radial distance, surrounds first friction ring 338, and is held in cage 302. Friction ring 321 is therefore disposed between friction cones 338 and 339.

Cage 302 consists of a frame, which is formed by two crossheads 354 and 355 and two parallel guide axles 356 and 357 held in them. These guide axles 356, 357 are disposed parallel to the roller-body axes 350, 351 and support positioning bridge 319 so that it is freely displaceable axially, by means of two journals 358 facing one another (numbered here only as an example), on which a first friction-ring holder 322 and a second friction-ring holder 323, respectively, each of which is formed from two pulleys disposed parallel to one another, are respectively seated. Friction-ring holders 322, 323 engage on both sides of friction ring 321 and give it the necessary axial guidance. It is self-evident that other arrangements that ensure corresponding guidance can also be used advantageously. For example, only one guide axle is sufficient in certain circumstances.

The center of crosshead 354 forms a vertical swiveling axle 311, around which the entire cage 302 can be swiveled.

In this exemplary embodiment, swiveling axle 311 lies in the plane 329 defined by roller-body axes 350, 351 of friction cones 338, 339. Instead of plane 329, it is also possible to choose a plane parallel thereto or a plane that intersects plane 329 at an acute angle.

If cage 302 is swiveled by a few degrees of angle, the friction drive brings about axial positioning of friction ring 321, which freely follows positioning bridge 319, thus achieving a change in the translation ratio of friction cones 338 and 339. A minute expenditure of energy is sufficient for this purpose.

Accordingly, although only a few embodiments of the present invention have been shown and described, it is to be understood that many changes and modifications may be made thereunto without departing from the spirit and scope of the invention.

What is claimed is:

1. A friction-ring transmission comprising:
   a friction ring;
   a first friction cone comprising a first friction-ring running surface;
   a second friction cone comprising a second friction-ring running surface; and
   at least one axial friction-ring securing element for preventing critical travel of the friction ring beyond at least one of the first and second friction-ring running surfaces;
   wherein a gap is formed between the first and second friction cones and the friction ring is disposed to be freely displaceable axially on the first and second friction-ring running surfaces and in the gap; and
   wherein the at least one axial friction-ring securing element is disposed on at least one of the first and second friction cones.

2. A friction-ring transmission comprising:
   a friction ring;
   a first friction cone comprising a first friction-ring running surface; and
   a second friction cone comprising a second friction-ring running surface;
   wherein a gap is formed between the first and second friction cones and the friction ring is disposed to be freely displaceable axially on the first and second friction-ring running surfaces in the gap; and
   wherein at least one of the first and second friction cones is provided with a narrowing element for narrowing the gap.

3. A friction-ring transmission comprising:
   a friction ring;
   a first friction cone comprising a first friction-ring running surface;
   a second friction cone comprising a second friction-ring running surface; and
   at least one axial friction-ring securing element for preventing critical travel of the friction ring beyond at least one of the first and second friction-ring running surfaces;
   wherein a gap is formed between the first and second friction cones and the friction ring is disposed to be freely displaceable axially on the first and second friction-ring running surfaces and in the gap; and wherein the at least one axial friction-ring securing element rotates with at least one of the friction ring, the first friction cone, and the second friction cone.

4. The friction-ring transmission according to claim 1, wherein the first friction-ring running surface has a first edge, the second friction-ring running surface has a second edge oppositely disposed to said first edge, and the at least one axial friction-ring securing element is disposed on the first edge so that the friction ring can travel no more than slightly beyond the second edge.

5. The friction-ring transmission according to claim 2, wherein the first friction-ring running surface has a first edge, the second friction-ring running surface has a second edge oppositely disposed to said first edge, and the narrowing element is disposed on the first edge so that the friction ring can travel no more than slightly beyond the second edge.

6. The friction-ring transmission according to claim 1, wherein the at least one axial friction-ring securing element is disposed on the first friction cone at least partly axially above the second friction-ring running surface.

7. The friction-ring transmission according to claim 2, wherein the narrowing element is disposed on the first friction cone at least partly axially above the second friction-ring running surface.

8. The friction-ring transmission according to claim 1, wherein the first friction-ring running surface has a first friction-ring running-surface circumference, the second friction-ring running-surface has a second friction-ring running-surface circumference, the first friction-ring running-surface circumference is smaller than the second friction-ring running-surface circumference, and the at least one axial friction-ring securing element is disposed on an axial end of the first friction-ring running surface.

9. The friction-ring transmission according to claim 2, wherein the first friction-ring running surface has a first friction-ring running-surface circumference, the second friction-ring running-surface has a second friction-ring running-surface circumference, the first friction-ring running-surface circumference is smaller than the second friction-ring running-surface circumference, and the narrowing element is disposed on an axial end of the first friction-ring running surface.

10. The friction-ring transmission according to claim 2, wherein the narrowing element comprises a shoulder at an axial end of the first friction-ring running surface axially limiting the first friction-ring running surface, said shoulder having an undercut facing the first friction-ring running surface.

11. The friction-ring transmission according to claim 1, wherein the at least one axial friction-ring securing element comprises a shoulder at an axial end of the friction-ring running surface axially delimiting the first friction-ring running surface, said shoulder having an undercut facing the first friction-ring running surface.

12. The friction-ring transmission according to claim 10, wherein the shoulder is lathed onto the first friction cone.

13. The friction-ring transmission according to claim 2, wherein each of the first and second friction cones is provided with a respective narrowing element, each narrowing element comprising a respective shoulder, the shoulders being provided axially on first and second sides of the gap.

14. The friction-ring transmission according to claim 1,
wherein the at least one axial friction-ring securing element is disposed on the first friction cone;
wherein the friction ring has a friction-ring width;
wherein edge radii are provided on at least an edge of the friction ring facing the at least one axial friction-ring securing element and on the first friction cone; and
wherein said edge radii have a radius greater than $1/100$ of the friction-ring width.

15. The friction-ring transmission according to claim 14, wherein the edge radii have a radius greater than $1/27$ of the friction-ring width.

16. The friction-ring transmission according to claim 2,
wherein the narrowing element is disposed on the first friction cone;
wherein the friction ring has a friction-ring width;
wherein edge radii are provided on at least an edge of the friction ring facing the narrowing element and on the first friction cone; and
wherein said edge radii have a radius greater than $1/100$ of the friction-ring width.

17. The friction-ring transmission according to claim 16, wherein the edge radii have a radius greater than $1/27$ of the friction-ring width.

18. The friction-transmission according to claim 1, further comprising a bearing face provided on the at least one axial friction-ring securing element, the bearing face rotating around an axle aligned parallel to an axis of rotation of the friction ring.

19. The friction-ring transmission according to claim 2, further comprising a bearing face provided on the narrowing element, the bearing face rotating about an axle aligned parallel to an axis of rotation of the friction ring.

20. The friction-ring transmission according to claim 1, further comprising naphthene oil traction fluid.

* * * * *